United States Patent Office 3,421,673
Patented Jan. 14, 1969

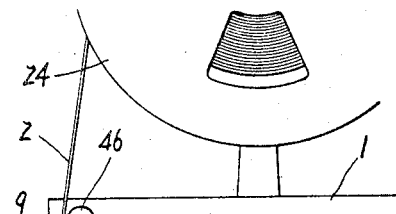
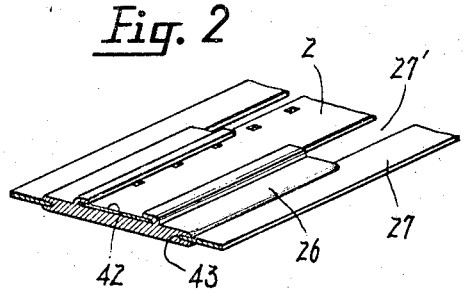
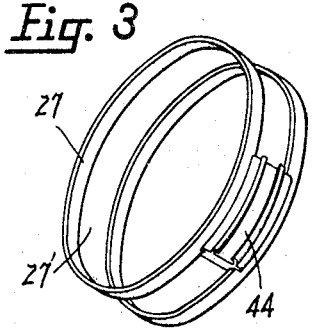
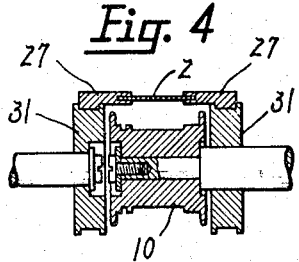
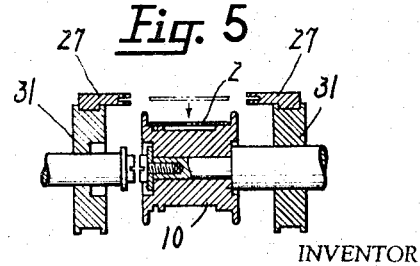
INVENTOR
YOSHIO NAKAMATSU

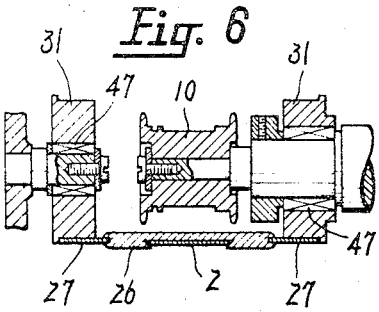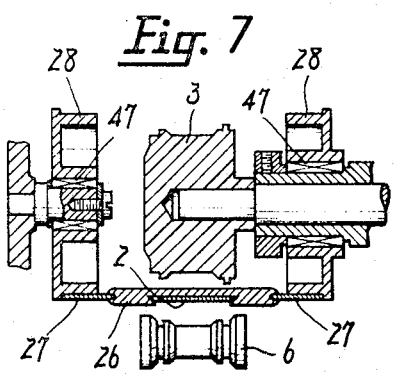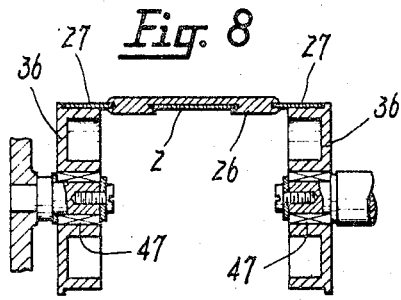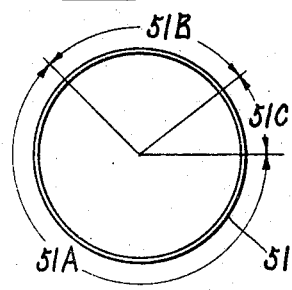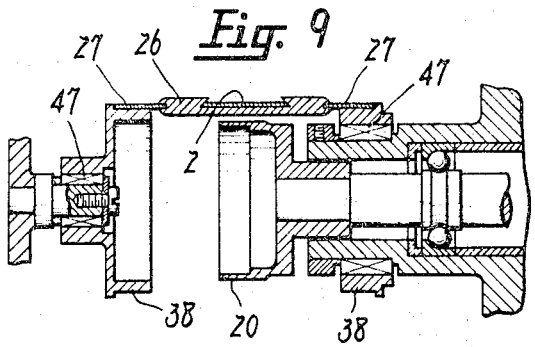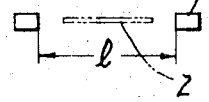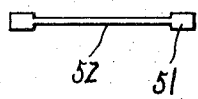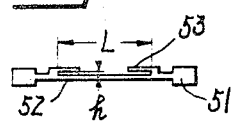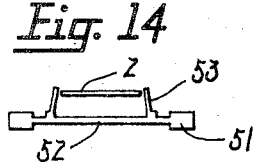

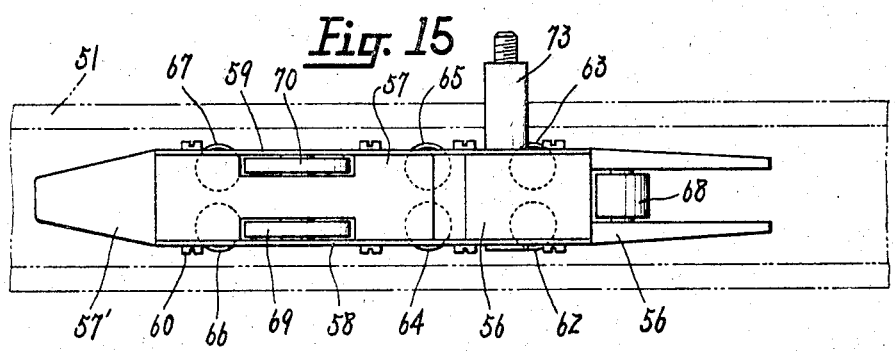
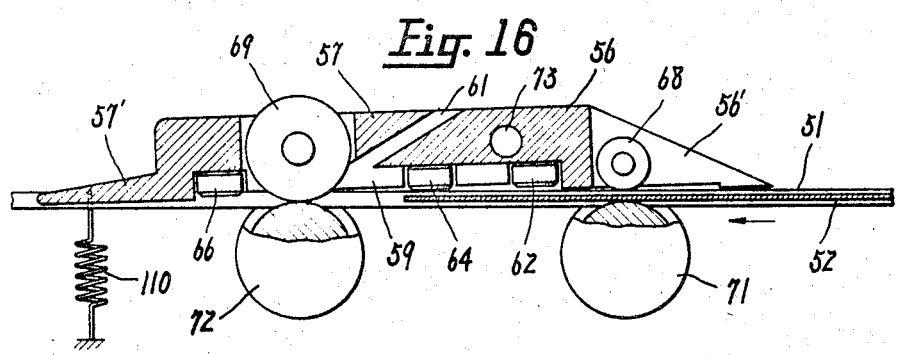
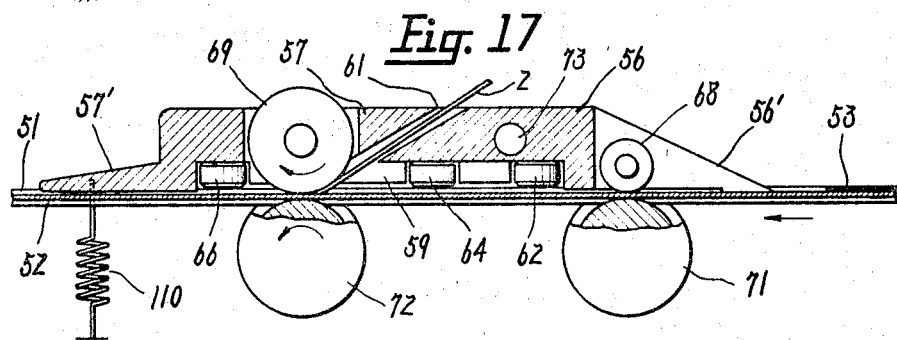
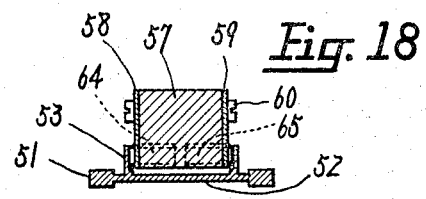

3,421,673
AUTOMATIC FILM THREADING DEVICE
Yoshio Nakamatsu, Tokyo, Japan, assignor to Hokushin Electric Works, Limited, Tokyo, Japan
Filed Nov. 21, 1966, Ser. No. 595,665
Claims priority, application Japan, Nov. 26, 1965, 40/72,248
U.S. Cl. 226—92          6 Claims
Int. Cl. G03b 1/58

This invention relates to automatic loading devices for films or tapes.

Automatic loading is important and convenient to various instruments using films or tapes such as projectors, sound recorders and reproducers, printers and tape recorders. However, conventionally seen devices have so many problems to still be solved on the positiveness of loading and the prevention of damage to films or tapes that they are not yet satisfactory.

Specifically the case of projectors shall be explained in the following. (The case of other instruments using tapes or films is the same.) In the conventional system, in order to demand the perfectness of automatic loading on all films different in the shape and deflection (radius of curvature) of the forward end, there is required an ingenious continuous film guiding part ranging over the entire film loading path. However, it is very difficult to provide a guide connecting part of a straight part in the path with a curved path such as a roller or sprocket and to a complicated path part such as around a sound reproducing part. Further, at the time of loading, as the film is fed by means of a sprocket or a pull down claw, the film being fed from one film driving source to the next driving source will be caught by the guiding path, will spring out through a slight clearance or will be curved due to its flexibility in case the width of the film guide is large or the distance between the driving sources is long and will thus cause a failure in loading. Such failure is because the forward end of the film is not bound at all, but is free. In the conventional system wherein a flexible film is fed out with a sprocket in loading, the above mentioned failure cannot be completely eliminated. For example, in an automatic loading device in which such film guide is used, a loading positiveness of 80 or 90% can be expected but it is unreasonable to expect a positiveness of 90% or more. Further, in case a guide is set continuously, it will be nearly impossible to entirely prevent the guide from contacting the film at the time of the normal operation. In most cases, this is the cause of the damage to the film.

The purpose of the present invention is to provide an automatic film or tape loading device in which such defects as are described above are eliminated and in which the loading positiveness is high. It is characterized in that flexible film or tape leading belts (which may be round or square in the cross-section or may be of any other form but shall be generally called belts hereinafter) a part of which form a closed circuit including a part or all of a film or tape loading path are fitted to the device and the forward end of the film or tape is inserted into said leading belts or a leading plate fixed to the belts, so that when the belts are moved along the film or tape loading path, the film or tape may be led from the forward end and the instrument may be positively loaded with the film and, at the same time, said leading belts are so formed as to be positioned in a part quite away from the film or tape passing surface at the time of the normal use so that the belts may not contact the film.

The present invention is characterized also in that there are provided an attaching mechanism for attaching a film to leading belts so that the film may be led positively through a course while the forward end of the film is prevented from becoming free and being caught by the guide on the way or projecting out at the time of loading and a removing mechanism for positively removing the film from the leading belts.

Therefore, an object of the present invention is to provide a device with which an instrument can be simply loaded with a film or tape.

Another object of the present invention is to provide a device with which an instrument can be safely and positively loaded with a film or tape without hurting it specifically by the loading mechanism part at the time of the normal operation.

A further object of the present invention is to provide an auxiliary mechanism for effectively attaching and removing a film or tape in automatic loading.

In the accompanying drawings:

FIG. 1 is a side view of a projector to which is applied an automatic loading device according to the present invention;

FIG. 2 is a perspective view of a leading plate in an embodiment of the present invention;

FIG. 3 is a perspective view of leading belts in another embodiment of the present invention;

FIG. 4 is a sectioned view showing relative positions of leading belts in still another embodiment of the present invention and film rollers at the time of projection;

FIG. 5 is a sectioned view showing the relative positions of the leading belts and film rollers in FIG. 4 at the time of loading;

FIG. 6 is a sectioned view of the roller part at the time of loading with a film;

FIG. 7 is a sectioned view of a sprocket part at the time of loading with the film;

FIG. 8 is a sectioned view of a loop part at the time of loading with the film;

FIG. 9 is a sectioned view of a sound drum part at the time of loading with the film;

FIG. 10 is an explanatory view of another embodiment of the leading belts for automatic loading according to the present invention;

FIGS. 11, 12, 13 and 14 are sectioned views of an opened part, continued part, film holding part and said holding part when film holding pieces are expanded and opened, respectively;

FIG. 15 is a plan view of a mechanism for attaching a film to leading belts;

FIGS. 16, 17 and 18 are sectioned views for explaining the operation of the attaching mechanism illustrated in FIG. 15;

Figure 19:
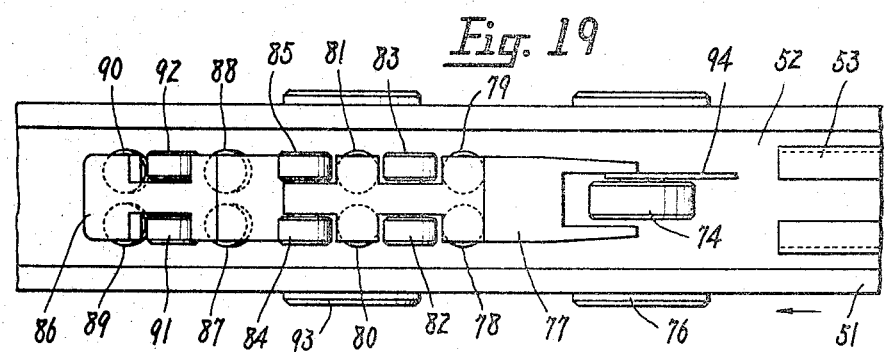
FIG. 19 is a plan view of a mechanism for removing the film from the leading belts.

The present invention shall be detailed with reference to the accompanying drawings illustrating the invention as applied to a projector.

1 is a projector frame. 2 is a film. 3 to 5 are respective sprockets. 6 to 8 are sprocket shoes. 9 to 14 are film guide rollers. 15 is a pressure plate. 16 is an aperture plate. 17 is a projecting lens. 18 is a projecting bulb. 19 is a group of condenser lenses. 20 is a sound drum. 21 is a pad roller for pressing the film 2 against the sound drum 20 at the time of projection. 22 is a damping roller for compensating film tensions and absorbing shocks. 23 is a tension roller for the same purpose. 24 is a film feeding reel. 25 is a winding reel. As shown in FIG. 1, at the time of projection, the film 2 from the feeding reel 24 will take a course of the guide rollers 9 and 10, sprocket 3, upper loop, lower loop, sprocket 4, guide roller 11, sound drum 20, pad roller 21, guide roller 12, damping roller 22, sprocket 5, guide roller 13, tension roller 23, guide roller 14, winding reel 25.

In the present invention, endless flexible belts 27 for leading the film are fitted in a part of them with a leading plate 26 for inserting the film and are hung on guide rollers 28 to 35 set coaxially respectively with the sprockets 3 to 5 for the film and with the guide rollers 10 to 14, on looped part guide rollers 36 and 37, guide rollers 38 and 39 and a driving roller 40 and on a driving roller 41 set coaxially with the film guide roller 9 along the same path as of the film 2 so that the forward end of the film 2 may be guided by said flexible belts 27.

Further, 45 and 46 are pressing rollers set against the driving rollers 40 and 41, respectively.

For example, as illustrated in FIG. 2, the leading plate 26 for inserting the film has in the middle part of it a groove 42 for holding the forward end of the film, has on each side of it a groove 43 to engage with the leading belt 27 and has its length made so proper that it may deviate from the running path of the film 2 when the film is projected.

Further, as illustrated in FIG. 3, a film inserting part 44 for holding the forward end of the film 2 may be made directly in a part of a hole 27' formed in the flexible belts 27 instead of using the leading plate 26 for inserting the film. Said hole 27' in the flexible belts 27 is provided not to close the passage between the projecting lens 17 and the light source when the flexible belts 27 run, and said hole is made wider than the film 2 so that the flexible belts 27 may not contact the respective rollers and sprockets for the film and may not interfere at all with the opening and closing, movement and rocking of the sprocket shoes, pad roller, damping roller and tension roller.

However, as illustrated in FIGS. 4 and 5, said flexible belts 27 may be so made that, after the completion of loading with the film 2, the rollers 31 on which the flexible belts 27 are hung may be moved axially to expand the hole 27' between the flexible belts 27. Also, in such case, there may be considered a construction in which the leading plate 26 is fixed to only one of the flexible belts 27.

The present invention is used in the following manner. First of all, after or as soon as the forward end part of the film 2 fed from the feeding roll 24 is inserted into the film leading plate 26 of a fixed length, the rollers 40 and 41 for driving the flexible belts 27 are rotated. In the embodiment in FIG. 1, said belts 27 are fed by the frictional force by the pressing with the rollers 45 and 46. But it is possible to feed the belts by making feeding teeth or perforations in the belts 27. The film 2 and leading plate 26 which have begun to move will pass around the roller 31. FIGS. 6, 7, 8 and 9 show sectioned views of the roller part, sprocket part, upper loop part and sound drum part, respectively. At the time of loading, the film 2 together with the leading plate 26 will pass in a position slightly away from the roller 10 so that the rotation of the roller 10 may not be obstructed. 47 is a roller bearing. Said film 2 and leading plate 26 will reach the roller 14 through substantially the same path as the above described film course at the time of projection. But, when the leading plate 26 passes, the sprocket shoes 6 to 8, pad roller 21 and pressure plate 15 will be in opened postions (FIG. 1). After the leading plate 26 (or the film inserting part 44 in the leading belts 27) has passed, they will be closed.

Further, in the damping roller part, at the time of loading the film 2 belts 27 will pass on a line connecting the roller 33 and sprocket 5 but, at the time of projection, when the damping roller 22 is moved from the position indicated by the chain line to the position of the solid line in FIG. 1, the clearance between the film surface and roller surface at the time of loading will be eliminated so that the film may have a proper tension in contact with the roller sprocket and others. The film 2 will be removed from the leading belts 27 in the position of the roller 35 and will be wound up on the winding reel 25 and the leading plate 26 will be returned to the periphery of the roller 41 through the rollers 40 and 39 to complete the loading. In the embodiment illustrated in FIG. 3, the film inserting part 44 in the belts 27 is positioned in the part of the roller 41 so that the opened part 27' may come to the film passing surface.

It is needless to say that the film 2 may be inserted into or separated from the leading belts either manually or automatically and that any known automatic winding method can be also applied to wind up the film.

As described above, the present invention has such many advantages that, as the forward end of the film or tape is led by the endless flexible belts moving through the always fixed path in loading, there can be provided a loading device in which such loading failure as the film being caught by a loading guide as seen in the conventional system will not occur at all and the positiveness is very high and that, as there is no need of providing a complicated guide continued to the respective parts and as the flexible belt will be in a position quite away from the film or tape at the time of the normal use, no damage will be caused to the film.

Further, the present invention can be applied not only to projectors but also to any other instruments using films or tapes.

Now, there shall be explained mechanisms for respectively attaching and removing the film to and from the leading belts in the case of automatic loading with the film.

FIGS. 10 to 14 illustrate the structures of the belts. There are provided two endless belts 51 arranged parallel to each other and having a clearance of a distance $l$ considerably larger than the width of the film 2 between them. They are formed of three parts in the order mentioned of an opened part 51A consisting of only said endless belts 51, a continued part 51B having a webbing 52 connecting the two belts 51 and a film holding part 51C having the same form as of the continued part 51B and, in addition, a pair of two film holding pieces 53 arranged symmetrically with each other to hold or enclose the film between them and the webbing 52 at a proper time or, more particularly, having surfaces formed integrally with the webbing and opposed to said webbing surface, each part being made of such soft and flexible or elastic material as, for example, rubber, so that, as the time of loading, the sprocket shoes, movable rollers and pressure plates in the film course may be kept opened or moved in order that the continued part 51B and the film holding part 51C may pass and the film 2 may be attached to the holding part 51C and led through the path and, when the opened part 51A comes, they may be returned to the original positions and the film may be fitted in the determined position so as to be in the normal projecting state. In such case, the opened part 51A will have come to the entire path. The clearance distance $l$ is made so much larger than the width of the film that the operation and opening and closing of the movable rollers, plates and film shoes may not be obstructed.

As a manner of holding the film, no special device is added to the belts 51 by means of such rigid body as of a metal or the like but, as in FIG. 13, two soft film holding pieces 53 of the same material as of the belts themselves are attached to the connecting film 52 so that the film may be closely attached to the webbing 52 while said holding pieces 53 are raised as in FIG. 14 and then the holding pieces 53 may be lowered on the film 2 to enclose it. In such case, even when the width L in FIG. 13 is made somewhat larger than the width of the film and the depth $h$ is made considerably larger (not less than 0.5 mm.) than the thickness (0.1–0.2 mm.) of the film, if the length of the film holding part is made so large that there may be at least one curved part of the film therein in any position in the loading path, the frictional force between the film and the holding pieces 53 or the webbing 52 will be so large that the film will be able to be positively led without slipping out of the belts 51.

Further, the principal object of the continued part is to connect the two belts 51 in the opened part 51A with each other so that both of the two belts 51 may be moved at a synchronous velocity. Therefore, the object can be attained even with the form of the film holding part. But, as the length of the holding part need not be so extremely large as is described above, it is advantageous to the manufacture of the belts that there is no film holding piece 53 over the entire length. Further, it is necessary that the length of the opened part 51A should be larger than the length of the film path part.

Now, the attaching mechanism for automatically and effectively attaching the film to the belts of such construction at the film path part beginning point shall be explained in the following.

In FIGS. 15 to 18, 56 and 57 are blocks for raising the film holding pieces 53. 58 and 59 are connecting plates to integrally fix both blocks. 60 is a set screw for them. 61 is a film inserting clearance formed by the blocks 56 and 57 and the plates 58 and 59. 62 to 67 are horizontal rollers for reducing the sliding friction between the raised film holding pieces 53 and the connecting plates 58 and 59 as illustrated in FIG. 18. 68 is a roller for positioning the forward end part of the block 56 and for reducing the friction with the connecting film 52. 69 and 70 are rollers for feeding in the film. 71 and 72 are guide rollers for the belt. 73 is a fulcrum shaft around which the integral blocks 56 and 57, connecting plates 58 and 59 and rollers 62 to 70 are made rotatable as a center. By a spring 110, the rollers 69 and 70 are always subjected to a force in a direction in which they are pressed against the roller 72. As illustrated in FIG. 16, the belts 51 are arranged between the rollers 71 and 72 and the above mentioned attaching mechanism. When the opened part 51A of the belts 51 is in the positions of the feeding rollers 69 and 70, said feeding rollers will come into direct contact with the guide roller 72 and the forward end part 56' of the block 56 will be above the surface of the webbing 52 of the belt. Here, when the belts 51 are moved in the direction indicated by the arrow and the continued part 51B of the belt is pushed into between the rollers 69 and 70 and the roller 72 as in FIG. 17, these rollers will be frictionally driven by the movement of the webbing 52 of the belt and will begin to rotate and, at the same time, the block 56 will rotate around the shaft 73 as a fulcrum and the bottom surface of the forward end 56' of the block will slightly touch the webbing 52. When the belts further move and the film holding part 51C comes, the forward end 56' of the block 56 will enter the space between the connecting film 52 and each film holding piece 53 and therefore the holding pieces 53 will begin to gradually raised and will be opened and expanded so widely that the film may freely come in as in FIG. 18 in the range of the rollers 62 to 67. In this state, as the holding pieces 53 are raised, if the film 2 is inserted through the inserting clearance 61, it will reach the contact points of the rollers 69 and 70 with the webbing 52 of the belt without any obstruction, will be bitten in between them, will come into close contact with the webbing 52 of the belt and will be continuously fed in with the movement of the belt. When the film comes to the rear end part 57' of the block 57, the film holding pieces 53 will begin to return to the original position while enclosing the film 2 and, when the film advances further and passes the rear end part 57', the film holding pieces 53 will completely enclose the film 2 and the attaching of the film will be completed.

Further, there is a film removing mechanism for automatically removing the thus attached film at the end point of the film course.

Figure 20:
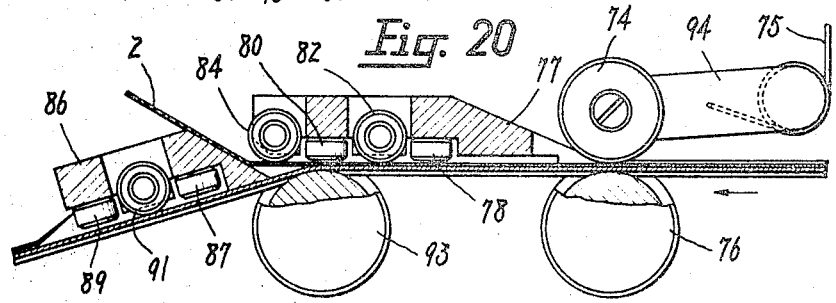
FIG. 20 is a vertically sectioned side view of FIG. 19.

In FIGS. 19 and 20, 74 is a roller for attaching the film closely to the belt webbing 52 and is pressed toward a guide roller 76 for the belts through a roller arm 94 by a spring 75. 77 is a film holding piece raising block which is so set that its forward end part made in an acute angle may be positioned just behind the contact point of the belt webbing 52 (or the roller 76) with the roller 74 and that a clearance may be made between its bottom surface and the belt webbing 52 so as to pass the film 2. Said block 77 is fitted with horizontal rollers 78, 79, 80 and 81 for reducing the friction when the film holding pieces 53 are raised, with vertical rollers 82 and 83 for reducing the friction on the belt connecting film and with guide rollers 84 and 85 for the film. 86 is a block for removing the film from the belt and is disposed as displaced in the rear of the block 77. 87, 88, 89 and 90 are horizontal rollers for reducing the friction and 91 and 92 are vertical rollers for the same purpose.

Now, when the holding part of the belts holding the film comes to the position of the roller 74, the film 2 will be pressed against the belt webbing and will advance straight while in contact with the belt webbing below the block 77 just behind the roller 74 and, on the other hand, the film holding pieces 53 will be gradually raised beginning with the forward end of the block 77 and will be expanded between the rollers 78, 79 and 89, 90 to be wide enough for the film in contact with the webbing 52 to be free. Here, if the course of the belts 51 is so bent by a guide roller 93 as to pass below the block 86 as in FIG. 20, the film 2 not bound at all by the holding pieces 53 will separate from the belt webbing 52 and will advance straight. Further as the film removing block 86 is formed and arranged as in FIG. 20 in order to make the separation positive, the film 2 will be gradually and continuously payed out along the inclined surface at the forward end of the block 86. When the film holding part 51 has passed and the opened part 51A has come, the removement of the film will automatically finish.

Figure 21:
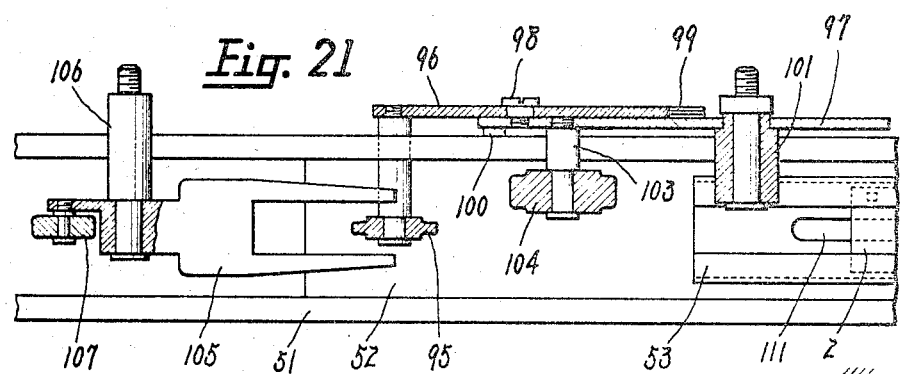
FIG. 21 is a plan view illustrating a modification of the removing mechanism.
Figure 22:
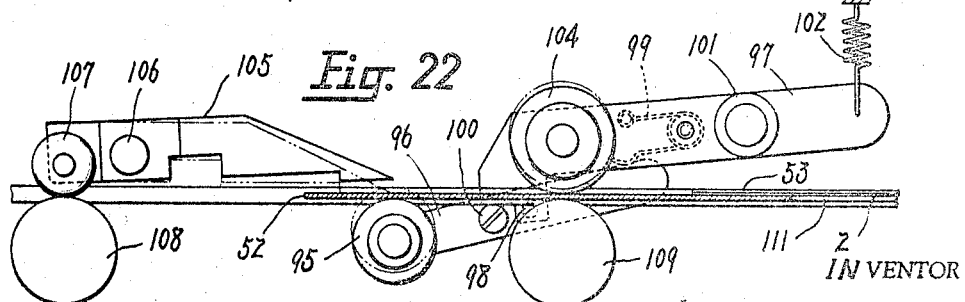
FIG. 22 is a vertically sectioned side view of FIG. 21.

FIGS. 21 and 22 illustrate another example of the film removing mechanism. As shown in the drawings, a slot 111 in the direction of the advance of the belts is made in the webbing in the film holding part of the belts 51 so that, in the case of attaching the film 2, its forward end may be positioned substantially in the middle of the slot 111. 95 is a film projecting roller held on an arm 96 rotatable around a fulcrum pin 98 fixed to an arm 97 as a center. Said arm 96 is lightly subjected to a force rotating it clockwise by a spring 99 and is engaged with an arm 97 through its fixed stopper pin 100 so as to regulate the position of the above mentioned roller 95.

The above mentioned arm 97 is rotatable around the fulcrum shaft 101 as a center, is pushed counterclockwise by a spring 102 with a force considerably larger than by the spring 99 and has detecting roller 104 fitted to a part of it through a shaft 103. When the opened part 51A of the belts 51 has come, said roller 104 will be in direct contact with a guide roller 109 but, when the webbing 52 comes, the detecting roller 104 will be displaced upward by the thickness of the webbing 52 and, in operative connection with it, the roller 95 will slightly contact the bottom surface of the webbing 52. When the belts further travel and the holding pieces 53 of the film holding part 51C come, the detecting roller 104 will further rise by the thickness of said holding piece and therefore the roller 95 will come to lightly press the webbing surface of the belt. Therefore, when the slot 111 comes to said position, the roller 95 will spring out through said slot as shown by the chain line in the drawing and will elevate the film 2 which is in close contact with the webbing 52 of the belts.

105 is a film removing block made so that, when its forward end part is inserted between the elevated film 2 and the webbing 52, the film 2 may be continuously removed from the belts with the travel of the belts. In such case, if the block 105 is made rotatable around a fulcrum shaft 106 as a center to make it easy to remove the film in the manner as in the case of the above described film attaching mechanism, when the beginning end of the webbing 52 passes, the forward end part of the block 105 will have risen above the film surface as shown by the solid line. When it passes between the rollers 107 and 108, the forward end of the block 105 will be in close contact with the webbing 52 as shown by the chain line and will raise the film holding pieces 53 so that the film 2 may be easily removed.

In this removing mechanism, even if the film 2 attached to the belts is extremely curled, it will be forcibly pulled off the belt film surface by the projecting roller 95 moved by utilizing the thickness of the film holding piece 53 and the block 105 will be inserted between the webbing 52 and the film 2 and will at the same time keep the film holding pieces 53 raised and therefore the film can be removed positively and smoothly.

The above mentioned attaching mechanism and removing mechanism are properly fitted to a projector in a position in which the film combined with the belt and in a position in which the film separates from the belt, respectively.

As described above, according to the present invention, there can be realized a belt type automatically loaded projector having such many advantages that the positiveness of loading is high.

In addition, in the present invention, as the film can be held positively with the belts themselves, the softness and flexibility of the belts will not be impaired and the belts can be arranged without any fear in any complicated curved course.

Further, in case the film attaching and removing mechanisms are fitted, the film can be attached and removed while continuously moving the belts and automatically by the movement of the belts without using any power source in feeding in and out the film.

Further, there are such many advantages that, as the film is attached to and removed from the belts in the positions in which the film holding pieces are completely raised, it can be positively attached and removed and no unreasonable force will be applied to the film. Thus, in the present invention, the effect of the belt type automatic loading can be enjoyed to the maximum.

What is claimed is:

1. An automatic film loading device comprising a pair of endless flexible parallel leading belts including a part or all of a film loading path and a leading plate which is provided between a part of said leading belts and is adapted to hold a fixed length of the forward end of the film, whereby, in loading, when said leading belts are moved, the forward end of the film will automatically be led along the path.

2. An automatic film loading device comprising two flexible endless leading belts disposed parallel to each other with a space between them greater than the width of the film to be loaded, said space between the belts being interrupted along a sectional length of the belts by a webbing connected to the belts, and at least a portion of said webbing carrying a pair of spaced film holding pieces arranged symmetrically about the longitudinal axis of the film loading course and having surfaces opposed to a surface of said webbing for holding the film while the film is conveyed through the loading course.

3. An automatic film loading device according to claim 2 wherein an attaching mechanism for automatically enclosing the film with the film holding pieces of the leading belts is provided near the beginning point of the film loading course and a removing mechanism for automatically removing the film is provided near the end point of said course.

4. An automatic film loading device according to claim 2 comprising a block equal in width to the space between the film holding pieces and having a forward supporting shaft, a forward end having the tip in an acute angle, middle rollers, a pair of rear rollers, a film loading clearance made just before said rear rollers, a rear end part having the tip in an acute angle and a spring provided in the rear end part, a roller in contact with said middle rollers and a roller in contact with said rear rollers, whereby the film holding pieces located in the film holding part of the loading belts inserted between the respective rollers may be expanded and opened by the forward end of said block and the forward end of the film inserted through the loading clearance may be held by the film holding pieces.

5. An automatic loading device according to claim 2 comprising a block having a roller loaded with a spring, a forward end part forked at the tip made in an acute angle and several pairs of rollers provided in horizontal and vertical directions, a second block in displaced relationship to the rear of said first mentioned block and having a forward end part made in an acute angle at the tip and several pairs of rollers provided in horizontal and vertical directions, a guide roller opposed to the first mentioned roller and a guide roller opposed to the first mentioned block, whereby, when the film holding pieces of the belts holding the film pass the first mentioned block between the first mentioned roller and the first mentioned guide roller and between the first mentioned block and the second mentioned guide roller, said film holding pieces may expand and open and, in the second mentioned block, the film may be removed from the film holding pieces.

6. An automatic loading device according to claim 2 comprising an arm pulled by a spring at one end, pivoted near the middle and having a roller at the other end, a roller carried by said other end, an arm carried by said arm near the middle and having a film projecting roller at the forward end and a spring at the rear end, an arm having a forward end part forked and made in an acute angle at the tip to be opposed to said film projecting roller and another roller and pivoted near the middle, a guide roller opposed to the first mentioned roller and a guide roller opposed to the third mentioned arm, whereby, when a slot made in the connecting film in the film holding part of the belts comes to the position of the film projecting roller, the film holding pieces holding the film may be expanded and opened by the forward end part of the third mentioned arm and the film may be removed from the film holding pieces.

References Cited

UNITED STATES PATENTS

| | | | |
|---|---|---|---|
| 1,991,137 | 2/1935 | Case et al. | 226—173 X |
| 2,869,865 | 1/1959 | Lechner | 226—173 |
| 3,032,247 | 5/1962 | Lechner | 226—173 |
| 560,424 | 5/1896 | Petit | 352—183 X |
| 1,362,985 | 9/1926 | De Vault | 352—183 |
| 2,695,545 | 11/1954 | Evans | 352—183 X |

M. HENSON WOOD, Jr., *Primary Examiner.*

J. P. MULLINS, *Assistant Examiner.*

U.S. Cl. X.R.

352—183